United States Patent [19]
Simon et al.

[11] 3,772,973
[45] Nov. 20, 1973

[54] FLASH AND SHUTTER SYNCHRONIZING MECHANISM

[75] Inventors: Horst Simon, Stuttgart; Heinz-G. Bethmann, Stuttgart-Hedelfingen, both of Germany

[73] Assignee: Eastman Kodak Company, Rochester, N.Y.

[22] Filed: July 25, 1972

[21] Appl. No.: 275,031

[30] Foreign Application Priority Data
Aug. 3, 1971 Germany .................. G 71 29 736.4

[52] U.S. Cl. ................ 95/11.5 R, 95/11 L, 240/1.3
[51] Int. Cl. .......................................... G03b 15/04
[58] Field of Search ...................... 95/11.5 R, 11 L; 240/1.3; 431/92, 93

[56] References Cited
UNITED STATES PATENTS

| | | |
|---|---|---|
| 3,552,287 | 1/1971 | Fink et al. ........................ 95/11.5 R |
| 3,584,794 | 6/1971 | Beach ................................. 240/1.3 |
| 3,661,063 | 5/1972 | Beach .............................. 95/11.5 R |

*Primary Examiner*—Robert P. Greiner
*Attorney*—W. H. J. Kline et al.

[57] ABSTRACT

A mechanism for synchronizing flash firing and shutter actuation utilizes an independently driven shutter driver and flash firing lever which are moved together to a synchronizing position after operation of the camera release. The driver and lever then separate for independent movement to respectively effect shutter actuation and flash firing.

3 Claims, 2 Drawing Figures

PATENTED NOV 20 1973　　3,772,973

FLASH AND SHUTTER SYNCHRONIZING MECHANISM

BACKGROUND OF THE INVENTION

1. Field of the Invention

The present invention relates to photographic apparatus and in particular to such apparatus having a mechanism for synchronizing shutter actuation and percussive flash firing.

2. Description of the Prior Art

The use of percussion ignitable flash units is now well known in the photographic arts. Many mechanisms have been developed for insuring synchronization of shutter actuation and percussion ignition of a flash unit. One such mechanism utilizing a single drive spring to provide synchronization is disclosed in U.S. Pat. No. 3,584,555. A two part striker unit is driven by a single spring until one part actuates shutter operation, with the other part continuing its movement to ignite a flash unit. Synchronization is dependent upon the energy imparted to the flash unit firing part. As the single drive spring fatigues, the time lag between shutter actuation and flash ignition will vary from the original design parameters and, eventually, the firing unit will not receive sufficient energy to fire the flash unit.

Another known mechanism for synchronizing shutter actuation and flash ignition has independently driven shutter driver and flash firing lever. The flash firing lever is latched by cooperating means on the shutter driver until the shutter driver is released during operation of the release member by the operator. The firing lever is simultaneously released for moving a firing slide to effect percussive ignition. However, since the shutter driver is coupled directly to the release member, the operator is unable to actuate the shutter driver without causing vibrations which may effect exposure of the film.

SUMMARY OF THE INVENTION

It is therefore an object of the present invention to provide an improved mechanism for synchronizing shutter actuation and percussion ignition of a flash unit in a photographic camera.

It is another object of the present invention to provide such an improved mechanism which is compact and easily actuated by a camera operator. These and other objects of this invention are achieved by a mechanism in which an independently driven shutter driver and firing lever are coupled by cooperating elements to insure synchronization. A separate release lever is movable by a release member to free the shutter driver and firing lever for movement to an unlatching position. After mutual unlatching, the shutter driver and firing lever move independently to their operative positions, thereby insuring synchronization and proper actuation of the camera elements.

BRIEF DESCRIPTION OF THE DRAWINGS

In the detailed description of the preferred embodiment of the invention presented below, reference is made to the accompanying drawings, wherein.

DETAILED DESCRIPTION OF THE PREFERRED EMBODIMENTS

Figure 1:
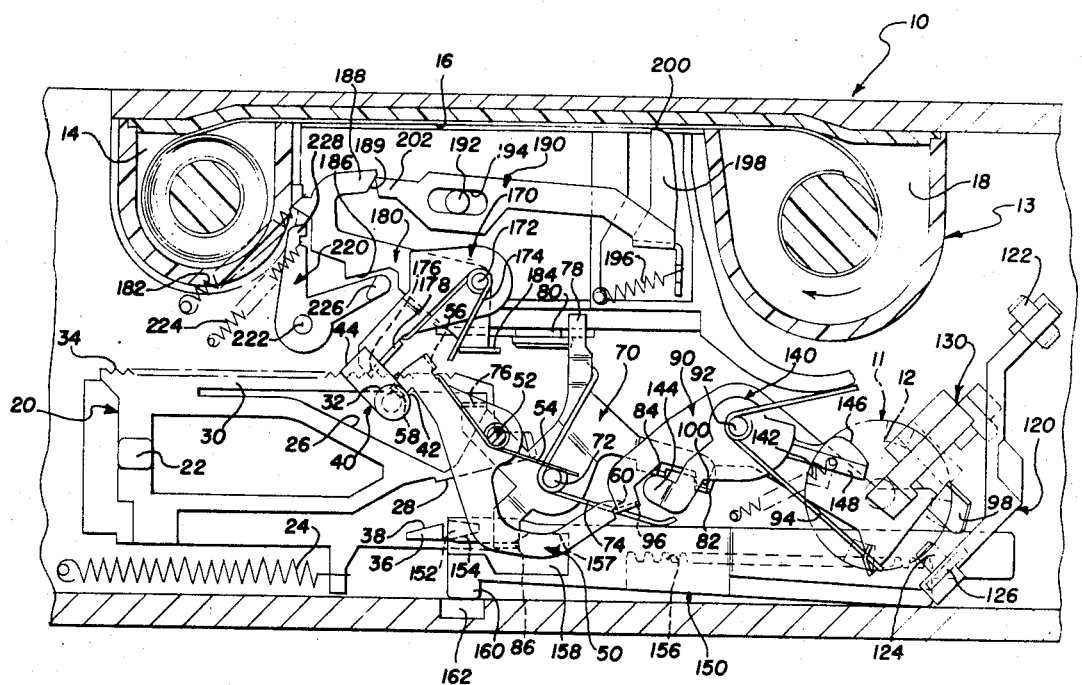
FIG. 1 is a top view, with partial schematic illustration, showing portions of a photographic camera with the synchronizing mechanism of the present invention in its cocked or energized position.

Because photographic cameras are well known, the present description will be directed in particular to elements forming a part of, or cooperating more directly with, the present invention. Camera elements not specifically shown or described are understood to be selectable from those known in the art.

A photographic camera incorporating the mechanism of the present invention is adapted to receive a film cartridge shown generally as 13 and includes a housing shown generally as 10 and a flash socket shown in dotted line as 11. Cartridge 13 is of the type having a supply chamber 14 in which a supply of film is stored and a take-up chamber 18, along with a film passageway 16 connecting chambers 14 and 18. The film stored within the cartridge is movable from supply chamber 14 along passageway 16 to take-up chamber 18 by a film transport mechanism in the camera adapted to cooperate with the cartridge. The film is of the type which has a metering perforation spaced at predetermined intervals therealong which cooperates with a metering mechanism in the camera to insure proper registration of each frame of the film for exposure. Flash socket 11 is of the type which has a predetermined firing position in which a pre-energized striker wire of a received flash unit is in firing position. Socket 11 further has four driving lugs 12 positioned at 90° intervals around its periphery, each lug having a driving surface on one face and a cam surface on an opposite face.

Mounted within housing 10 is an actuating member 20 having an operating tab 22 which normally extends outside the camera body. Actuating member 20 is slidably movable within housing 10 and is biased by a spring 24 in a leftward direction as shown in FIG. 1. Actuating member 20 also includes a shutter cam surface 26 located for cooperation with a shutter driver 70; a flash cam surface 28 located for cooperation with a firing lever 90; a locking bar 30 located for cooperation with a release member 40, locking bar 30 having a release recess 32 defined therein; a rack 34 extending along one edge of locking bar 30; and a stud 36 located for cooperation with a film advance member 150, stud 36 having a cam surface 38 defined thereon.

Release member 40 is movably mounted within housing 10 and normally extends outside the camera body. Release member 40 has a cam surface 42 located for cooperation with a release lever 50 and further defines a locking recess 44 located for cooperation with a locking lever 170.

Release lever 50 is pivotally mounted on pin 52 and is biased by spring 54 in a counterclockwise direction. One end of release lever 50 terminates in an ear 56 and a cam surface 58. Ear 56 is engageable with rack 34 of actuating member 20. Cam surface 58 is located for cooperation with cam surface 42 on release member 40. The other end of lever 50 is provided with a latching portion 60 for cooperation with firing lever 90.

Shutter driver 70 is pivotally mounted on a fixed pin 72 and is biased by spring 74 in a counterclockwise direction. Driver 70 has four outwardly extending arms, each terminating in a engaging lug. A lug 76 is positioned to be engaged by shutter cam surface 26 of actuating member 20. A lug 78 is positioned to engage a shutter blade 80 to cause movement of shutter blade 80 to an exposure position. Shutter blade 80 will return to its closed position under spring bias. Lugs 82 and 84 are provided for respective cooperation with firing lever 90 and a flash indexer 140. A lug 86 is positioned for cooperation with film advance member 150.

Firing lever 90 is rotatably mounted on a fixed pin 92 and is biased in a clockwise direction by spring 94. One end of lever 92 terminates in a latching lug 96 which is engageable by latching portion 60 of release lever 50. The other end of firing lever 90 terminates in a cam surface 98 positioned for cooperation with a striker release lever 120. Firing lever 90 further has a latching lug 100 engageable by lug 82 on shutter driver 70.

Striker release lever 120 is pivotally mounted on a fixed pin 122 and is positioned so that an arm 124 is engageable by cam surface 98 upon rotation of firing lever 90. One end of lever 120 terminates in a release end 126 which is movable to release a pre-energized striker of a received flash unit upon rotation of firing lever 90.

A control lever 130 is positioned for cooperation with striker release lever 120 in a known manner to move lever 120 to its operative position when a flash unit is received in socket 11. Moreover, control lever 130 maintains lever 120 in an inoperative position in the absence of a flash unit.

Flash indexer 140 is co-mounted on pin 92 and is biased by spring 142 in a clockwise direction about pin 92. One end of indexer 140 terminates in an engaging surface 144 which is positioned for engagement with lug 84 on shutter driver 70. The other end of indexer 140 terminates in an engaging surface 146 and a cam surface 148. Surface 146 is positioned to engage a driving surface of a lug 12 on flash socket 11. Cam surface 148 is positioned to engage a cam surface of a lug 12 on flash socket 11.

Film advance member 150 includes a lug 152 having a cam surface 154; a tooth section 156 engageable with a gear of a film transport mechanism of a type known in the art which interacts with the film in cartridge 13 to provide advancement of the film; an engaging surface 157 defining a recess 158 into which lug 86 on shutter driver 70 extends and a lug 160 extendable into a recess 162 defined in housing 10.

The camera further includes a film advance locking and film sensing mechanism which will now be described in detail. Locking lever 170 is pivotally mounted on a fixed pin 172 and is biased by a spring 174 in a clockwise direction. Locking lever 170 has a tooth 176 which is positionable in engagement with rack 34 on actuating member 20. Lever 170 further has a bent-up portion 178 engageable in locking recess 44 on release member 40 when member 40 is depressed.

Intermediate lever 180 is co-mounted with lever 170 on pin 172 and is biased in a counterclockwise direction by spring 182. Lever 180 includes a upwardly extending lug 184 which is positioned in the path of lug 78 after actuation of shutter blade 80. Lug 184 further engages one end of spring 174 thereby operatively coupling lever 180 with locking lever 170. Lever 180 further has a cam surface 186 and terminates in an end 188 having an engaging surface 189.

A metering lever 190 is movably mounted on a fixed pin 192 which extends into a recess 194 within lever 190. Lever 190 is biased by a spring 196 in a clockwise direction about pin 192 and further in a leftward direction with pin 192 moving within recess 194. Lever 190 terminates in a first end 198 which has a sensing pawl 200 adapted to engage a metering perforation within the film. Lever 190 further has a second end 202 engageable with end 188 and engaging surface 189 on intermediate lever 180.

Actuation of the synchronization mechanism of this invention will now be described. The mechanism as shown in FIG. 1 is in its cocked or energized position and, it is assumed, that a flash unit has been properly positioned on socket 11. To actuate the mechanism, the operator presses downwardly on release member 40 which passes through release recess 32 in locking bar 30, thereby causing clockwise movement of release lever 50 by engagement of cam surface 42 with cam surface 58. Latching portion 60 on release lever 50 is thereby moved out of engagement with lug 96, freeing firing lever 90 for movement in a clockwise direction under the urging of spring 94. Shutter driver 70 begins counterclockwise movement under the bias of spring 74 simultaneously with movement of firing lever 90. However, release lever 90 and shutter driver 70 are maintained in operative engagement through lug 82 and lug 100. After a predetermined interval, lugs 82 and 100 will disengage. Shutter driver 70 is thereby freed for actuation of shutter blade 80 by lug 78 under the urging of spring 74. Simultaneously, firing lever 90 initiates percussive firing of a flashlamp by engagement of cam surface 98 with arm 124 on striker release lever 120, thereby driving release end 126 upward to release a pre-energized striker within the flash unit. After movement, levers 70 and 90 are in position to be moved to their cocked positions since, simultaneously, lug 76 has been moved into operative engagement with cam surface 26 and lug 96 has been positioned in the path of movement of cam surface 28 on actuating member 20.

Figure 2:
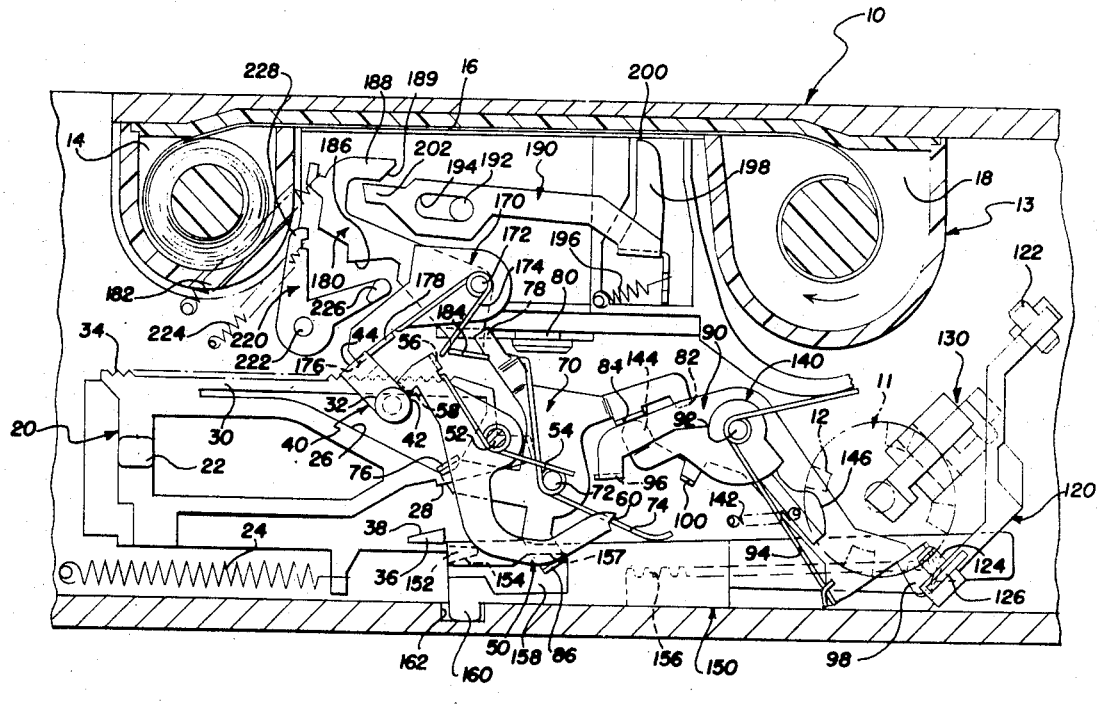
FIG. 2 is a view similar to FIG. 1 showing the mechanism of the present invention in its uncocked or fired position.

In addition to actuating shutter 80, shutter driver 70 further acts with respect to the actuating, film transport, sensing and metering and flash indexing mechanisms as will now be described. Lug 78 engages lug 184 on intermediate lever 180, thereby causing rotation of lever 180 in a clockwise direction against the bias of spring 182. Rotation of lever 180 disengages surface 189 from engagement with end 202 of metering lever 190, permitting lever 190 to move to its sensing position under the bias of spring 196. Movement of lever 180 is also transmitted through spring 174 to locking lever 170 thereby disengaging tooth 176 from rack 34 on actuating member 20, if release member 40 has been released by the operator. If member 40 is still depressed, movement of locking lever 170 will be prevented by the presence of bent-up portion 178 in recess 44 in release member 40 until member 40 is released. In addition, lug 86 moves away from engaging surface 157 within recess 158 of film advance member 150, permitting member 150 to move under bias of spring 74 until lug 160 has entered recess 162 in housing 10. Movement of member 150 removes lug 154 from the path of stud 36 on actuating member 20. Simultaneously, flash indexer 140 is rotated in a clockwise direction under the bias of spring 142 with engaging surface 144 maintained in contact with lug 84 on shutter driver 70. Rotation of indexer 140 to its operative position as shown in FIG. 2 is made possible by cooperation between cam surface 148 on indexer 140 and a mating cam surface on driving lug 12. Thus, metering lever 190 is now in its sensing position, actuating member 20 has been unlocked, film advance member 150 has been moved out of operative alignment with actuating member 20 and indexer 140 is now in its operative position.

Actuating member 20 is now moved to the right by operator actuation of tab 22 which extends outside of the camera housing. As member 20 moves to the right, shutter cam surface 26 engages lug 76 on shutter driver 70 thereby causing movement of shutter driver 70 in a clockwise direction against the bias of spring 74. As driver 70 rotates, lug 86 engages surface 157 of film advance member 150. However, stud 36 will already have passed lug 152 and thus member 150 is not moved during the first stroke of member 20. Simultaneously, flash cam surface 28 engages lug 96 on firing lever 90, thereby causing counterclockwise rotation of firing lever 90 against the bias of spring 94. Continued rotation of driver 70 and firing lever 90 is maintained until engagement of respective lugs 82 and 100 and latching of latching portion 60 on release lever 50 with lug 96 on firing lever 90. At this time, shutter driver 70 and firing lever 90 have been returned to their cocked positions as illustrated in FIG. 1, in preparation for exposure of the next frame of film. It should be noted that member 20 must be moved until cocking and latching occur. Early return movement of member 20 is prevented by ear 56 on release lever 50 which engages rack 34 when release member 40 is not depressed. Tooth section 56 permits member 20 to move to the right but prevents return movement until it is held out of engagement with rack 34 by the spring bias on driver 70 and firing lever 90. Member 20 may then return under bias of spring 24, with stud 36 passing lug 152 by engagement of cam surfaces 38 and 154.

Flash indexing is accomplished during this first cocking and latching stroke of member 20. Flash indexer 140 is rotated in a counterclockwise direction against the bias of spring 142 by contact between engaging surface 144 and lug 84 on driver 70 as driver 70 rotates. Engaging surface 146 contacts a mating driving surface on a lug 12 on socket 11 and thus causes rotation of socket 11 by 90°.

Movement of sensing pawl 200 into engagement with the film is also achieved during this first cocking and latching stroke of member 20. As driver 70 rotates, intermediate lever 180 follows under the urging of spring 182. End 188 of lever 180 engages end 202 of metering lever 190 and rotates lever 190 until pawl 200 rests against the film in sensing position. Continued movement of lever 180 and consequent movement of locking lever 170 is prevented by the presence of film in contact with pawl 200.

Film transport is effected upon subsequent actuation of element 20. Stud 36 now engages lug 152 on film advance member 150 thereby causing movement to the right of member 150 and simultaneous movement of the film through a gearing system which transmits movement of member 150 to film take-up spool 18 within cartridge 13. Film advance continues until sensing pawl 200 engages a perforation in the film. Pawl 200 is adapted to be carried along by the film after entering a perforation, thereby moving metering lever 190 to the right against the bias of spring 196. This movement is continued until end 202 of metering lever 190 disengages from end 188 of intermediate lever 180, thereby permitting lever 180 to move in a counterclockwise direction under the urging of spring 182 and bringing tooth 176 on locking lever 170 into engagement with rack 34 on actuating member 20. Member 20 is thus locked against further movement to the right. However, member 20 may move to the left under the urging of spring 24 when the operator releases tab 22. It should also be noted that disengagement of ends 188 and 202 also permits spring 196 to remove pawl 200 from the perforation in the film by clockwise rotation of lever 190. However, metering lever 190 will not return to its sensing position because of engagement of end 202 with cam surface 189 until subsequent actuation of driver 70 moves end 202 back into engagement with end 188, freeing lever 190 for movement to the left. At this time, the film has been advanced one frame, the flash socket has been rotated by 90° and shutter driver 70 and firing lever 90 have both been returned to their respective operative positions. The camera is now in condition for exposure of the new frame of the film.

Unlatching lever 220 is provided within the camera to permit actuation of the camera mechanisms in the absence of a cartridge. Member 220 is pivotally mounted on a fixed pin 222 and is biased in a counterclockwise direction by a spring 224. Member 220 has a lug 226 which engages cam surface 186 on intermediate lever 180 when an end 228 of lever 220 moves into the cartridge compartment. Lug 226 rotates lever 180 in a clockwise direction thereby removing tooth 176 from engagement with rack 34 on actuating member 20. Thus actuating member 20 and the synchronization mechanism of this invention may be operated in the absence of a cartridge in the film.

The invention has been described in detail with particular reference to a preferred embodiment thereof but it will be understood that variations and modifications can be effected within the spirit and scope of the invention.

We claim:

1. In a camera having a shutter and means for receiving a flash lamp unit, a shutter and flash actuating mechanism comprising:
   means, including a first movable member, for actuating said shutter;
   means, including a second movable member, for actuating a received flash lamp unit; and
   means coupling said shutter and flash actuating means for maintaining said first and second movable members in contact, for moving said first and second movable members to a predetermined synchronizing position while in contact and for separating said first and second movable members for independent movement thereafter to effect actuation of said shutter and a received flash lamp unit.

2. In a camera having a shutter and means for receiving a flash lamp unit of the type having a lamp firable by striking and a pre-energized striker associated with each such lamp which is releasable to effect such firing, a shutter and flash actuating mechanism comprising:
   means, including a shutter driver movable from a first to a second position, for actuating said shutter;
   means, including a firing lever movable from a first to a second position, for releasing such a pre-energized striker; and
   means coupling said actuating and releasing means for maintaining said shutter driver and said firing lever in contact, for moving said shutter driver and said firing lever while in contact to a predetermined synchronizing position intermediate said respective first and second positions and for separating said shutter driver and said firing lever after movement to said predetermined synchronizing position for independent movement to said respective second positions.

3. In a camera having a shutter and means for receiving a flash lamp unit of the type having a lamp firable by striking and further having a pre-energized striker associated with each such lamp which is releasable to effect such firing, a shutter and flash actuating mechanism comprising:

a firing lever movable from a first to a second position to effect release of such a pre-energized striker;

means for moving said firing lever from said first to said second position;

a shutter driver movable from a first position to a second position to actuate said shutter;

means for moving said shutter driver from said first to said second position; and means for maintaining said shutter driver and said firing lever in contact during movement to a predetermined position intermediate said respective first and second positions and for separating said shutter driver and said firing lever after movement to said predetermined position for independent movement to said respective second positions.

* * * * *